United States Patent [19]

Cruickshank et al.

[11] Patent Number: 4,951,250

[45] Date of Patent: Aug. 21, 1990

[54] COMBINED INPUT/OUTPUT CIRCUIT FOR A PROGRAMMABLE CONTROLLER

[76] Inventors: Ancil B. Cruickshank, 390 Raysford Cir., Earlysville, Va. 22936; Ronald E. Gareis, 9 Salisbury Sq.; Mark J. Kocher, 2120 Wisteria Dr., both of Charlottesville, Va. 22901; Michael J. Tuso, Rte. 2 Box 826, Afton, Va. 22920

[21] Appl. No.: 272,973

[22] Filed: Nov. 18, 1988

[51] Int. Cl.$^5$ .............................................. G06F 13/00
[52] U.S. Cl. ................................ 364/900; 364/926.9; 364/926.93; 361/98
[58] Field of Search ... 364/200 MS File, 900 MS File

[56] References Cited

U.S. PATENT DOCUMENTS

| | | | |
|---|---|---|---|
| 4,564,879 | 1/1986 | Bienstman | 391/98 |
| 4,593,380 | 6/1986 | Kocher et al. | 364/900 |
| 4,628,397 | 12/1986 | Garlis et al. | 391/98 |

*Primary Examiner*—David Y. Eng

[57] ABSTRACT

A combined input/output circuit is provided which is configurable either as in input circuit or an output circuit for use in a programmable controller. The input/output circuit includes apparatus which detects undesired overcurrent and overvoltage external conditions and adaptively protects itself from such conditions. The circuit includes a sensing circuit which is capable of sensing overcurrent conditions and detecting input data depending on the configuration of the input/output circuit. The inherent characteristics of a switching device used to configure the circuit in either an input or output state are used to detect overcurrent and to limit fault current.

8 Claims, 4 Drawing Sheets

COMBINED INPUT/OUTPUT CIRCUIT FOR A PROGRAMMABLE CONTROLLER

BACKGROUND OF THE INVENTION

This invention relates in general to programmable controllers for use in controlling manufacturing, industrial and other processes. More particularly, the invention relates to input/output circuits for use in conjunction with such programmable controllers.

BRIEF SUMMARY OF THE INVENTION

Programmable controllers are a relatively recent development in the process control field. Process control with programmable controllers generally involves the monitoring of input signals from a number of process sensors which report events and conditions occurring in a process. Process control further involves the generation of output signals commonly referred to as control signals which are transmitted to various output devices to control the implementation of the process.

Contemporary programmable controllers include a central processing unit (CPU) for processing the various instructions of a control program. The control program is stored in a memory coupled to the CPU and contains instructions which tell the CPU what output or control signals to generate in response to various input signals received by the CPU. Generally, an input/output (I/O) system is disposed between the CPU and the input sensors and control devices. The conventional I/O system includes a plurality of input points each of which is coupled to a respective input device such as a temperature sensor, pressure sensor, volumetric flow sensor and the like. Such I/O systems also typically include a plurality of output points which are coupled to respective control devices such as a start switch, a solenoid, a conveyer speed control and the like.

In the past, most I/O points have been either dedicated input points or dedicated output points. Once an I/O point was designated an input point it was not easily converted into an output point, and similarly once an I/O point was designated an output point it was not easily converted into in input point. This problem was solved by the invention described and claimed in U.S. Pat. No. 4,593,380 issued to Kocher et al. and assigned to the present assignee. The Kocher et al. patent describes a dual function input/output system for a programmable controller in which an I/O point may be selected to operate either as an input point or as an output point. In that system, current sensing and voltage sensing are accomplished separately from one another.

One object of the present invention is to provide a dual function input/output circuit for a programmable controller in which current sensing and voltage sensing are integrated.

It is desirable to incorporate protection circuitry to protect the programmable controller from undesirable operating conditions. For example, U.S. Pat. No. 4,628,397 to Gareis et al. describes protected input/output circuitry for use with a programmable controller. The Gareis et al. patent is also assigned to the present assignee.

A further object of the present invention is to provide an input/output circuit which senses undesirable short circuit or overcurrent faults at the I/O points and which self protects against such occurrences.

Yet another object of the invention is to provide an input/circuit which adjusts the fault sensing threshold to different values depending on whether the I/O point is configured as in input or an output.

Still another object is to provide a selectable input/output circuit which utilizes inherent characteristics of a control device for detecting overcurrent conditions.

In one embodiment of the invention, an input/output circuit is provided for use with a programmable controller including a central processing unit (CPU), the circuit being selectively operable under the control of the CPU either as an input circuit for receiving input signals from an input device or as an output circuit for providing control signals to an output device, the circuit including a power terminal, an I/O terminal and a common terminal, the output device being connectable between the power terminal and I/O terminal, the input device being connectable between the I/O terminal and common, a pull-up resistor being coupled between the power terminal and the I/O terminal. The input/output circuit further includes a controllable switching device, coupled between the I/O terminal and the common terminal, the switching device being switched on and off in response to a control signal. A control processor is coupled to the switching device for generating the control signal to turn off the switching device when the circuit is configured as an input circuit, and to turn the switching device on and off when the circuit is configured as an output circuit. The input/output circuit further includes an adaptive sensing circuit, having an output coupled to the control processor, for determining when the voltage at the I/O terminal exceeds a first predetermined threshold reference voltage $V_{REF1}$ when the circuit is configured as an input circuit and for determining when the voltage at the I/O terminal exceeds a second predetermined threshold reference voltage $V_{REF2}$ when the circuit is configured as an output circuit.

The features of the invention believed to be novel are specifically set forth in the appended claims. However, the invention itself, both as to its structure and method of operation, may best be understood by referring to the following description and the accompanying drawings.

DETAILED DESCRIPTION OF THE INVENTION

Figure 1:
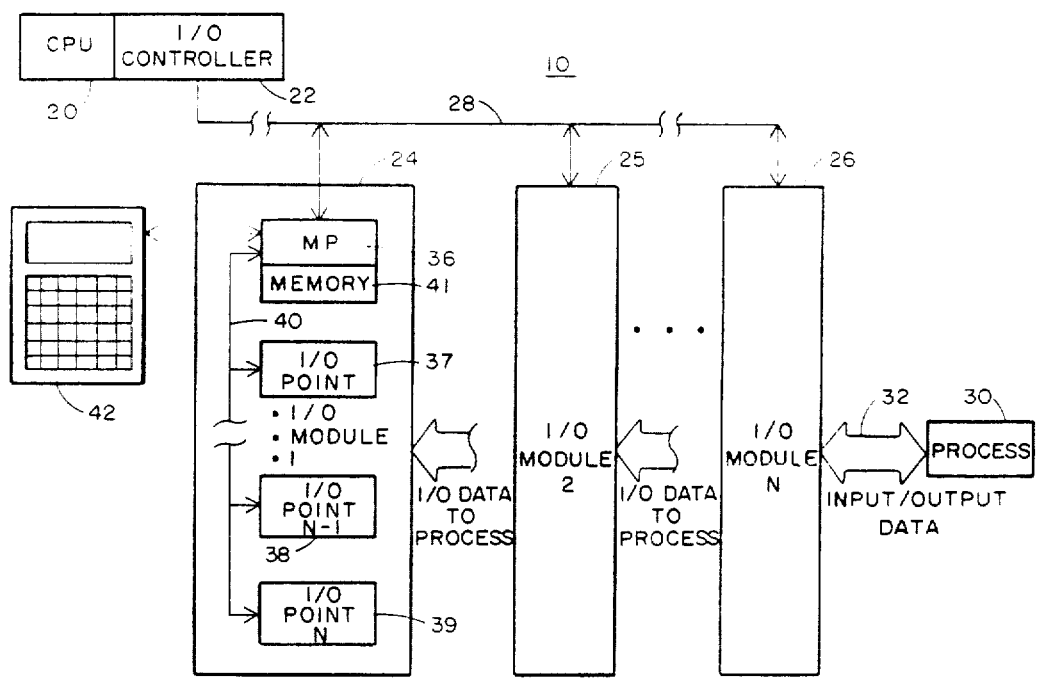
FIG. 1 is a block diagram of a conventional programmable process controller.

Turning now to FIG. 1, a block diagram of the prior programmable controller described and claimed in the aforementioned U.S. Pat. No. 4,593,380 to Kocher et al. is shown as programmable controller 10. The disclosure of U.S. Pat. No. 4,593,380 to Kocher et al. is incorporated herein by reference. The present invention involves significant improvements over the controller 10 of the Kocher et al. patent as will become clear in the later discussion. However, as a basis for appreciating the significance of the present invention, a brief summary of controller 10 of the Kocher et al. patent is now presented.

Programmable controller 10 is shown in FIG. 1 as including a central processing unit (CPU) 20 coupled to an input/output (I/O) controller 22. I/O controller 22 is coupled to a plurality of input/output modules 24, 25 and 26 via a data communications link 28. These elements, excluding the CPU, form the input/output system of the programmable controller. CPU 20 generally includes one or more microprocessors for data handling and control, plus memory for storage of operating programs, input/output data, and other computed, interim or permanent data for use in executing the stored program and for implementation of control. In addition, other conventional elements, such as power supplies, are included as necessary to make CPU 20 fully functional. The I/O controller 22 provides for control of information exchanged between the various I/O modules 24–26 and CPU 20.

Each I/O module 24–26 may be separately located, remotely from CPU 20 and I/O controller 22, and in close proximity to the device or process being controlled. Although only three I/O modules are illustrated in FIG. 1, it will be understood that the actual number may be considerably greater. Each I/O module is independent of the other and each may be devoted to control of a process separate from that controlled by all the other modules. For example, the Nth module 26 in FIG. 1 is illustrated to control a generalized process 30. The input and output signals associated with process 30 are conveyed by conductors 32 which run between the process 30 and the I/O module 26. The process 30 may, of course, take virtually any form. Process 30 includes various sensors, switches, etc. (not shown) for sensing the status and condition of process 30. The information from the process is in the form of input signals to I/O module 26. Process 30 also includes controlled elements (for example, pumps, motors, also not shown) which receive the output signals from I/O module 26 and which thereby effect control of process 30. In similar fashion, each of the other I/O modules 24 and 25 is interconnected to input and output devices and apparatus associated with a process.

Data communications link 28 is preferably a serial link although parallel transmission of signal between CPU 20 and the I/O modules 24–26 may be readily provided. In either case, I/O modules 24–26 are connected to the communications link 28 for communication with CPU 20. Communications link 28 may comprise a twisted pair of conductors, a coaxial cable, or a fiber optics cable; all are acceptable depending on such considerations as cost and availability.

In FIG. 1, I/O module 24 illustrates in block diagram form the general overall electronic structure of each I/O module. That is, there is a microprocessor 36 having an interface port for exchanging information with CPU 20 and including an associated memory 41 for implementation of a stored program of operation according to which the various elements of the I/O modules are controlled and diagnosed for incurred faults. The programmable controller 10 of FIG. 1 further includes a plurality of individual I/O points (or I/O circuits) 37–39, each of which may be selectably operated either as an input point or an output point and each of which interfaces individually through conductors directly to input or output elements of the controlled process. Controller 10 includes a conductor bus 40 for interconnecting the I/O points 37–39 to the microprocessor 36.

FIG. 1 includes a hand held monitoring apparatus 42 which is adapted for connection to each I/O module to permit monitoring of the I/O points of a particular module. More detail with respect to hand held monitoring apparatus 42 and programmable controller 10 is found in the aforementioned U.S. Pat. No. 4,593,380.

Figure 2:
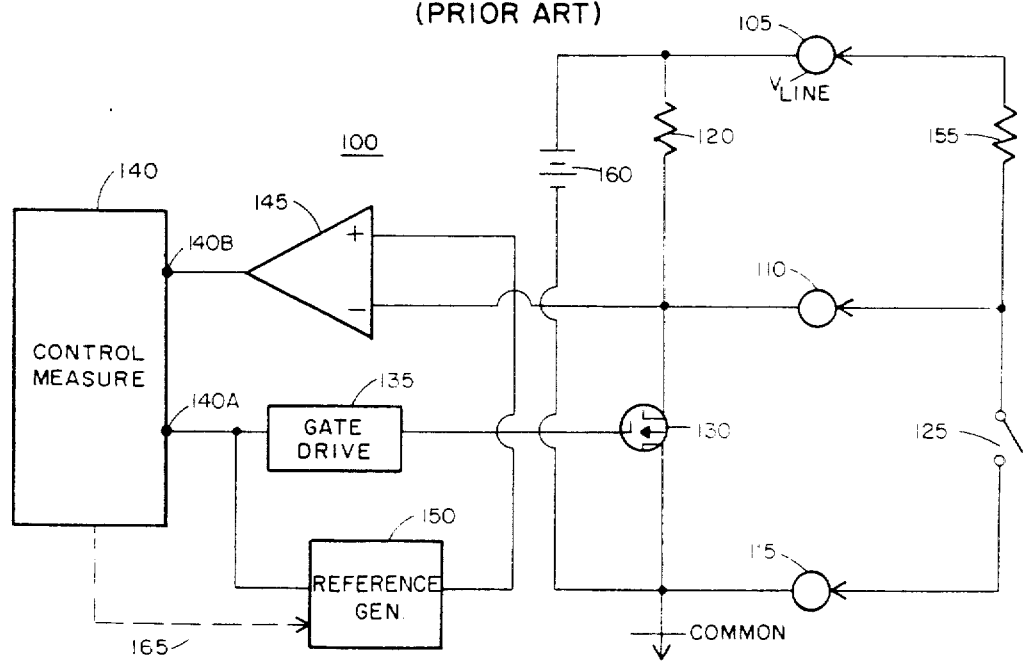
FIG. 2 is a block diagram of the input/output module of the present invention.

The present invention is an improved input/output module (I/O circuit) 100 which may be employed as one of the I/O modules 24–26 described above. I/O circuit 100 is illustrated in FIG. 2 as including a power terminal 105, an input/output terminal 110 and a common terminal 115 which is coupled to ground (or circuit common). A preload or pull-up resistor 120 is coupled between power terminal 105 and I/O terminal 110.

When I/O circuit 100 is employed as an input circuit, an input device 125 is coupled between I/O terminal 110 and common terminal 115. Input device 125 may be a sensor or other input device. As seen in FIG. 2, I/O circuit 100 further includes a field effect transistor (FET) 130 having its drain coupled to I/O terminal 110 and its source coupled to ground and common terminal 115. The gate of FET 130 is coupled by a gate drive amplifier 135 to a drive output 140A of a control processor 140. In one embodiment of the invention, control processor 140 is a microprocessor or microcontroller which controls the operation of the remainder of circuit 100. Processor 140 observes the input (or output) operating conditions reported at its sense input 140B and takes appropriate actions at drive output 140A according to instruction preprogrammed therein as discussed later in more detail.

When I/O circuit 100 is used as an input circuit, processor 140 issues an appropriate drive signal at drive output 140A to cause FET 130 to be held in the off (non-conductive) state. At this point, it is noted that as shown in FIG. 2, the I/O terminal 110 is coupled to an inverting input of a two input comparator 145 which is employed as a voltage sensor as explained subsequently. The drive output 140A of processor 140 is coupled via a selectable threshold reference voltage generator 150 to a non-inverting input of comparator 145. The output of comparator 145 is coupled to the sense input 140B of processor 140. As mentioned above, FET 130 is turned off when I/O circuit 100 is configured as an input circuit. In FIG. 2, input device 125 is represented as a contact which opens and closes. As input device 125 is opened and closed, voltage is alternately applied to and removed from the input of circuit 100, namely I/O terminal 110. The presence or absence of input voltage at I/O terminal 110, placed there by whatever type of sensor or input device whether or not the contact type device shown, is detected by comparator 145 which operates as a voltage sensor. That is, threshold voltage reference generator 150 generates a voltage, $V_{REF1}$, at its output when circuit 100 is configured as an input circuit. The voltage $V_{REF1}$ is provided to the non-inverting input of comparator 145. In this manner, whenever the input voltage at I/O terminal 110 exceeds the $V_{REF1}$ voltage, comparator 145 generates a sense signal which is fed back to the sense input of processor 140. The processor is thus continuously apprised of the state of the input device.

When circuit 100 is employed as an output circuit, an output device or load 155 is coupled between the POWER terminal 105 and the I/O terminal 110. Load 155 represents a device which is controlled via circuit 100. In this instance, a voltage $V_{LINE}$ is sourced to power terminal 105 by connection of a voltage source 160 to power terminal 105. Processor 140 turns output device 155 on and off by applying voltage to and removing voltage from device 155. More specifically, to apply voltage to output device 155, processor 140 generates a drive signal at processor output 140A which causes gate drive circuit 135 to generate an appropriate voltage at its output to turn FET 130 on. To remove voltage from output device 155, processor 140 generates a drive signal which causes gate drive circuit 135 to generate an output voltage signal which turns FET 130 off. Stated alternatively, when control processor 140 turns FET 130 off, the voltage at load 155 is high with respect to ground. However, when processor 140 turns FET 130 on, a pulldown effect results which pulls the voltage at load 155 low with respect to ground.

When circuit 100 is employed as an output circuit, comparator or voltage sensor 145 detects the presence or absence of a voltage at I/O terminal 110 greater than the threshold voltage signal at the non-inverting input of comparator 145. This information is reported back to processor 140 via input 140B. A feature of the present invention is that when FET 130 is turned on, the voltage threshold from reference generator 150 exhibits a different value from that which generator 150 exhibits when FET 130 is turned off. Thus, when circuit 100 is configured as an input circuit, reference generator 150 generates a first reference threshold, $V_{REF1}$, at its output. However, when circuit 100 is configured as an output circuit, reference generator 150 generates a second reference voltage, $V_{REF2}$ which is more compatible with protection of circuit 100 from undesired overcurrent or overvoltage conditions occurring at output device 155.

Figure 3:
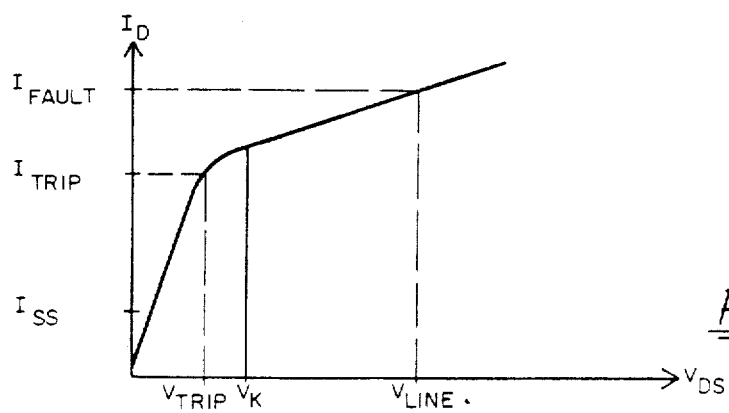
FIG. 3 is a voltage vs. current (V-I) curve for one type of switching transistor device employed in the input module of the present invention.
Figure 4A:
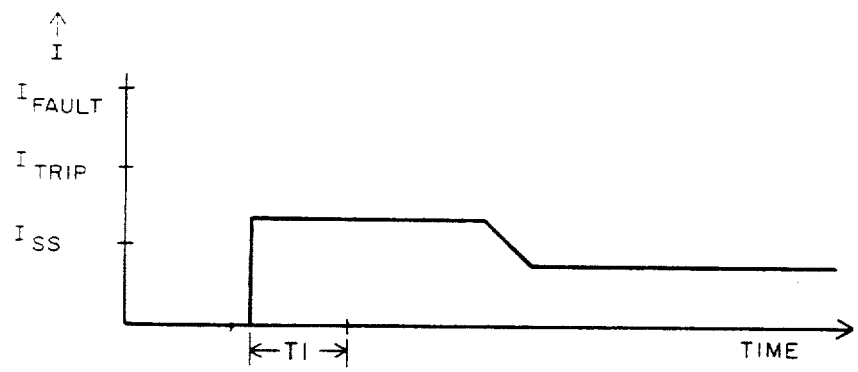
FIGS. 4(a) to 4(d) are graphical representations of four different operating scenarios for the input/output module of the present invention.
Figure 4B:
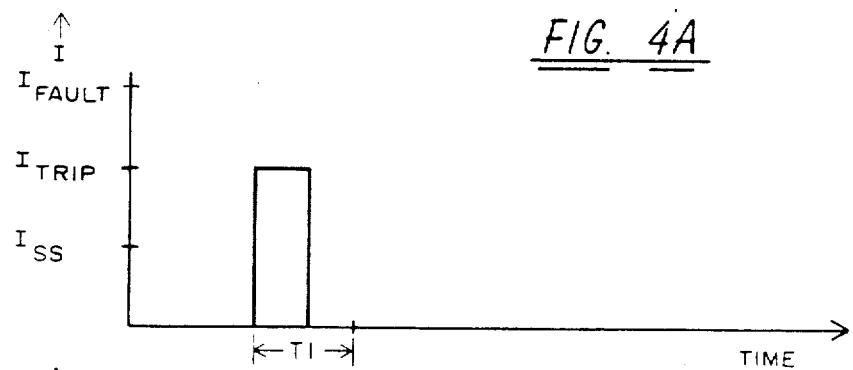
Figure 4C:
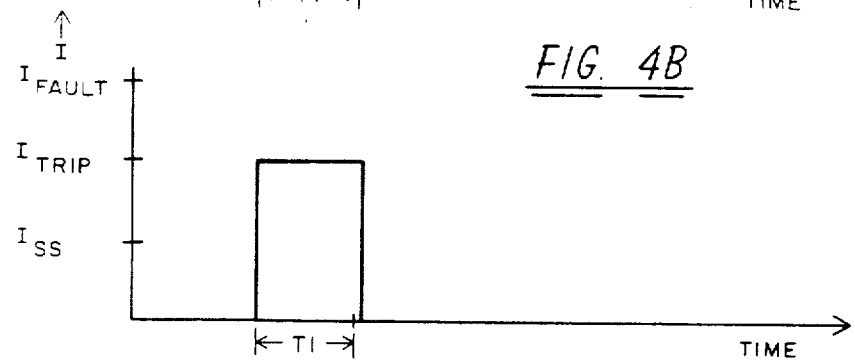
Figure 4D:
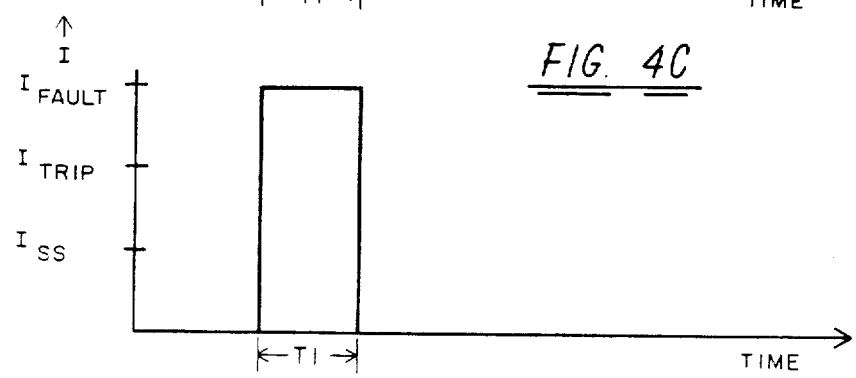

To understand the operation of the overcurrent and overvoltage protection features of circuit 100, it is helpful to refer to the V-I characteristic of a typical FET for a fixed value of $V_{GS}$ (gate to source voltage) as shown in FIG. 3. In FIG. 3, the horizontal axis represents the voltage, $V_{DS}$, applied across the drain and the source of an FET. The vertical axis represents the drain current, $I_D$, through the FET device. Those skilled in the art appreciate that as the voltage $V_{DS}$ increases from zero to higher values, the current $I_D$ through the FET increases substantially linearly until a $V_{DS}$ voltage $V_K$ or knee voltage is reached. The linear region between 0 volts and $V_K$ volts is referred to generally as the "conduction region", "on region" or "linear region" of operation of the FET. In this region the FET device is considered to be "on" and the resistance exhibited by the FET is substantially constant. In this "linear region" or "on region" of operation, the voltage drop across the FET is predictable for a given value of current, $I_D$, through the FET. As seen in FIG. 3, the steady state rated current, $I_{SS}$, through the FET is within this linear region. However, as the $V_{DS}$ across the FET continues to increase above and beyond the knee voltage, $V_K$, the resistance exhibited by the FET substantially increases as well. Once the $V_{DS}$ across the FET increases to values greater than the knee voltage, the $I_D$ current through the device does not substantially increase for further increases in drain to source voltage, $V_{DS}$, providing of course that $V_{DS}$ is not increased to a value so large that breakdown of the FET device occurs. Thus, the FET device is said to be "saturated" or operating in the "current saturation region" when it is biased such that $I_D$ does not substantially change when $V_D$ is further increased.

The above described FET characteristics are employed to protect input/output circuit 100 from undesired external operating conditions. More specifically, when undesired operating conditions in the input or output devices coupled to I/O terminal 110 cause a current in excess of $I_{TRIP}$ to flow through FET device 130, then circuit 100 shuts down in the manner now described. $I_{TRIP}$ is defined to be the overcurrent trip level, that is, a sufficiently high level of FET current to pose a threat to the operational integrity of the FET. $I_{TRIP}$ is selected to be within the "linear region" and adjacent the knee of the FET device curve at $V_K$.

The operational parameters or characteristics of the FET are selected such that the steady state rated current, $I_{SS}$, and the overcurrent trip level, $I_{TRIP}$, both fall within the "linear region" of the FET. As noted above, the "on" state resistance of the FET is known. Thus, at the trip level of current, $I_{TRIP}$, through the FET device, the voltage across the FET will have a corresponding trip value, $V_{TRIP}$. The voltage threshold level, $V_{REF2}$, supplied to the voltage sensor or comparator 145 is selected such that there is a "SENSE" transition at the output of comparator 145 when such voltage threshold level exceeds $I_{TRIP}$. In this manner, the comparator 145 is employed as an overcurrent detector to advantageously avoid the requirement of a separate current sensor. When processor 140 detects such a SENSE transition at terminal 140B, which indicates an overcurrent condition, processor 140 generates a drive signal at output 140A which causes FET 130 to turn off after a predetermined amount of time, T1. That is, if processor 140 determines that an overcurrent condition exists for more that the predetermined amount of time, T1, the processor removes gate drive from FET 130 to protect input/output circuit 100 from damage.

The above described protective apparatus and technique represent a first mode of protection for circuit 100 against overcurrents which occur for a period of time greater than T1. Circuit 100 also employs a second mode of self protection which protects against current transients of a shorter time duration than time T1. A momentary short circuit fault at power terminal 105 or I/O terminal 110 is one possible source of such a short duration undesirable current transient. In this second mode of protection in circuit 100, the device parameters of FET 130 are selected such that FET 130 goes into current saturation and substantial current limiting when a relatively short duration current transient exhibiting a current level somewhat larger than $I_{TRIP}$ reaches FET 130. Time T1 and the FET characteristics are selected so that the device stays within its safe operating region. Since the slope of the V-I curve of FET 130 is relatively flat and low after $I_{TRIP}$ and the knee of the V-I curve is reached, current surge transients in excess of $I_{TRIP}$ do not result in substantial increases in FET device current in the saturation region above $I_{TRIP}$. Thus, for a given line voltage $V_{LINE}$ at terminal 105, the resultant current $I_{FAULT}$ which the FET carries due to the current surge is not substantially greater than $I_{TRIP}$. It is noted that for the first mode of protection, the parameters of FET device 130 are selected to withstand the $I_{TRIP}$ current surge for the period of time, T1, which represents the FET turn-off delay employed by processor 140.

FIG. 4 illustrates four possible output current vs. time profiles which are associated with four different types of loads 155. Output current is defined to be the current through FET 130 caused by load 155. The curve indicated at 41 shows an output current vs. time curve resulting when load 155 draws an output current which is within the normal operating range of input/output circuit 100. This curve illustrates the normal current inrush profile wherein the output current exhibits a value less than $I_{TRIP}$. That is, load 155 at first draws an inrush current higher than the normal steady state output current or load current and the output or load current then falls back to the steady state level of its own accord. Under these operating conditions, input/output circuit 100 does not shut down regardless of whether such current conditions continue for periods of time less than or greater than T1 since $I_{TRIP}$ is not exceeded.

Curve 43 illustrates output current vs. time resulting when load 155 causes a current surge somewhat larger than $I_{TRIP}$ but the peak output current is limited by load 155 and the duration of the current surge is less than the T1 time delay. Under these conditions, input/output circuit 100 and FET 130 do not shut down since the T1 time delay is not exceeded.

Curve 45 illustrates output current vs. time associated with a load 155 which causes a current surge somewhat larger than $I_{TRIP}$ and where the peak output current is limited by load 155 but the duration of the current surge is greater than the T1 time delay. Under these operating conditions, input/output circuit 100 and FET 130 are shut down since the T1 time delay is exceeded. Input/output circuit 100 is thus protected from such undesired operating conditions.

Curve 47 illustrates current vs. time resulting from a short circuit fault in load 155. It is noted that in this situation, the output current or fault current, $I_{FAULT}$, exceeds the trip level, $I_{TRIP}$ sufficiently such that $I_{FAULT}$ falls within the saturation region of FET device 130. The threshold voltage $V_{REF}$ from reference generator 150 is chosen such that comparator 145 will change its output state when current though FET 130 exceeds $I_{TRIP}$ by detecting the increased voltage developed across the FET. The peak current through the FET 130 and the load is limited by the characteristic parameters of FET 130. That is, the fault current $I_{FAULT}$ is determined by the characteristics of FET 130 and the line voltage, $V_{LINE}$. Circuit 100 continues in operation conducting current until control processor 140 determines that the $I_{FAULT}$ overcurrent condition has continued for more that the T1 time period or time delay. As seen by curve 47, should the $I_{FAULT}$ condition continue for a period of time in excess of T1, gate drive is removed from FET 130 so that conduction ceases and the output current falls to zero. Input/output circuit 100 is thus protected from such short circuit conditions.

Figure 5:
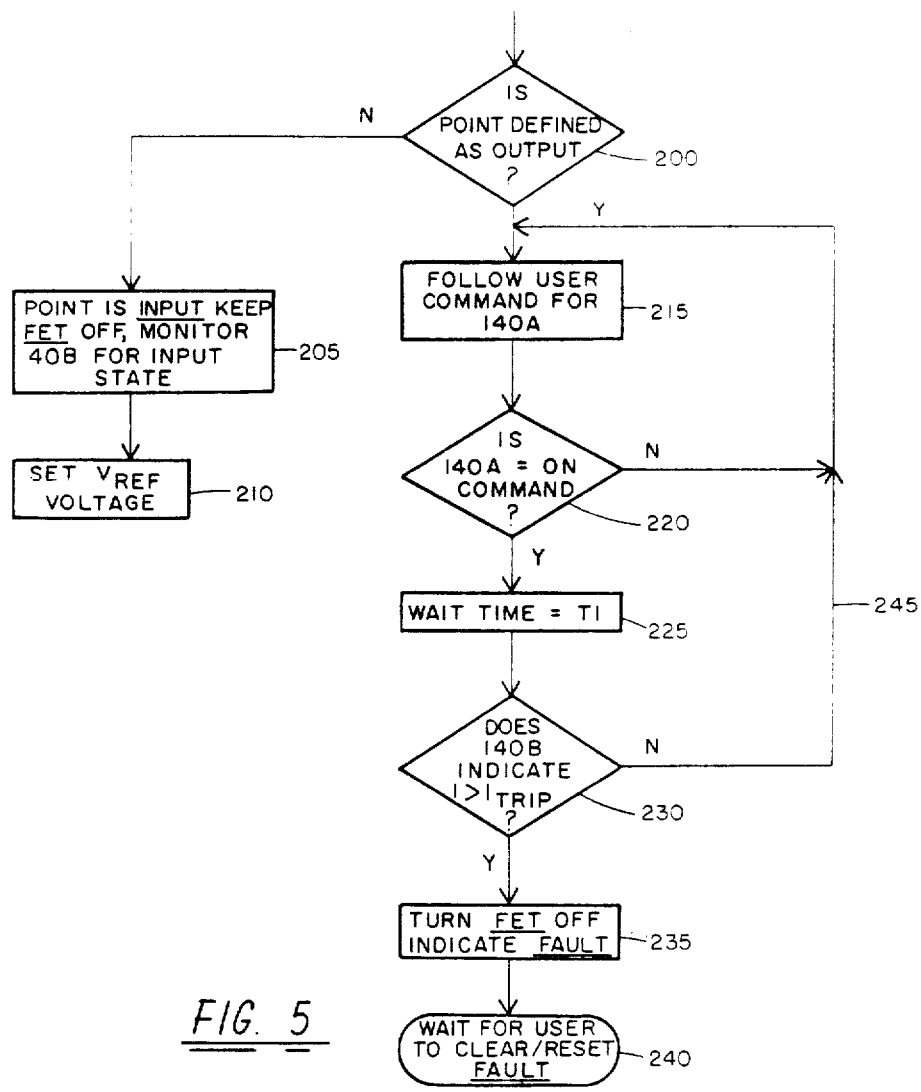
FIG. 5 is a flowchart detailing the operation of the processor and other circuits of the input/output module of the present invention.

FIG. 5 is a flowchart of the program which guides the operation of control processor 140 of input/output circuit 100. This program resides in read only memory (ROM) forming part of memory 41 coupled to control processor 140. The processor program outlined in FIG. 5 shows only that portion of the program associated with I/O circuit 100. Block 200 is a decision block for determining whether the I/O circuit is to be used as an input or an output point. For an input point, the program branches to block 205 which sets FET 130 to an OFF state (removes gate drive at terminal 140A) and sets the processor to check for sense transitions at terminal 140B. In the embodiment of the invention illustrated in FIG. 2, the reference voltage $V_{REF}$ from generator 150 is only allowed two values, one for use when I/O circuit 100 is set as an input point and one when it is set as an output point. In some instances, it may be desirable to provide multiple reference voltage values, particularly when the circuit is used as an input point. For these latter cases, the program may continue to block 210 to set the generator 150 output to some selected value as a function of the type or value of input signal to be detected at terminals 110, 115. This may require additional signal lines to generator 150 as indicated by dashed line 165. As a further modification, it will be apparent that multiple $V_{REF}$ voltages could be provided simultaneously to multiple comparators 145 if it were desirable to determine the level of signal at terminals 110, 115 within a selected range.

Returning to block 200, if the circuit 100 is user selected to be an output point, the program forces generation of a gate enable signal at terminal 140A upon receipt of a user command, block 215. The program continuously cycles through a decision block 220 to determine if a gate enable signal has been generated at terminal 140A. Without an enable signal, the decision block 220 directs the program to continue waiting (cycling) for a user command. When an enable signal is generated, a timer is started, block 225, and the system waits for the preselected T1 time-out period. At the end of time T1, a check is made for the state of terminal 140B, block 230. If the output state of comparator 145 indicates that current through FET 130 exceeds $I_{TRIP}$, the gate enable signal is removed from terminal 140A turning FET 130 off, block 235. The system then waits for a user reset command, block 240. If comparator 145 does not indicate current greater than $I_{TRIP}$ at the end of time T1, the program cycles, line 245, to again await a user command.

The foregoing has described a dual function input/output circuit for a programmable controller in which overcurrent sensing and voltage sensing are integrated, i.e., the inherent characteristics of a switching device, e.g., a FET, are used to detect overcurrent conditions and to disable the I/O circuit. The same circuit functions used to determine the state of input or output devices also serves to detect overcurrent conditions. Thus, the inventive system incorporates its own self-protection. Additionally, the switch characteristics are used to limit fault currents. The input/output circuit adjusts its fault sensing reference threshold voltages to different values depending on whether the I/O circuit is configured as in input or an output point.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. An input/output (I/O) circuit for use with a programmable controller including a central processing unit (CPU), the circuit being selectively operable under the control of the CPU either as an input circuit for receiving input signals from an input device or as an output circuit for providing control signals to an output device, said circuit comprising:

a power terminal, an I/O terminal and a common terminal, said output device being connected between said power terminal and I/O terminal, said input device being connected between said I/O terminal and said common terminal, a resistor being coupled between said power terminal and said I/O terminal;

controllable switching means connected between said I/O terminal and said common terminal for selectively coupling said I/O terminal to said common terminal, said switching means being switched between conductive and non-conductive states in response to a control signal, said switching means being selected to exhibit an approximately linear voltage to current relationship at low voltage levels and a current limiting characteristic at high voltage levels;

control processing means coupled to said switching means for generating a value of said control signal to maintain said switching means in a non-conductive state when said circuit is configured as an input circuit, and for generating values of said control signal for selectively switching said switching means between conductive and non-conductive states when said circuit is configured as an output circuit;

adaptive sensing means, having an output coupled to said control processing means, for determining when the voltage at said I/O terminal exceeds a first predetermined threshold reference voltage when said circuit is configured as an input circuit and for determining when the voltage at said I/O terminal exceeds a second predetermined threshold reference voltage when said circuit is configured as an output circuit; and means operatively associated with said processing means for determining, when said I/O circuit is configured as an output circuit, if said I/O terminal voltage exceeds said second reference voltage after a predetermined time interval after generation of a signal for gating said switching means into conducting, said processing means removing said gating signal if said I/O voltage exceeds said second reference voltage.

2. The input/output circuit of claim 1 wherein said switching means comprises a semiconductor device exhibiting a linear region, a knee, and a current saturation region, the parameters of said semiconductor device being selected such that in normal operation of said circuit, said semiconductor device operates in said linear region.

3. The input/output circuit of claim 2 wherein the operating parameters of said semiconductor device are selected such that when current through said semiconductor device exceed an $I_{TRIP}$ current, said device is operating in said current saturation region to effectively limit such current through said semiconductor device.

4. The input/output circuit of claim 3 wherein said semiconductor device comprises a field effect transistor.

5. In a programmable controller having multiple input and output points for exchanging signals between a controlled process and a central processing unit (CPU) of the controller, input/output (I/O) circuitry selectably operable as either an input point or an output point with integral overcurrent protection when operating as an output point comprising:

a power terminal, an I/O terminal and a common terminal, a voltage source being connected between said power terminal and said common terminal and a resistor being connected between said power terminal and said I/O terminal;

a field effect transistor (FET) having gate, source and drain terminals, said source and drain terminals being interconnected between said I/O terminal and said common terminal;

a gate drive circuit interconnecting said gate terminal of said FET and a signal output terminal of the CPU for controlling the conductive states of said FET in response to signals from the CPU;

a reference signal generator having an input terminal connected to the CPU, said signal generator providing selected reference voltage signals in response to signals from the CPU, at least one of said selected reference voltage signals being selected to indicate an overcurrent condition when said I/O terminal voltage exceeds said at least one of said reference voltage signals;

a comparator having a first input terminal connected to said I/O terminal and a second input terminal connected for receiving said reference signals from said reference signal generator, said comparator providing a first signal when a voltage at said I/O terminal is less than a voltage at said second input terminal thereof and providing a second signal when a voltage at said I/O terminal is greater than a voltage at said second input terminal thereof; and said FET being preselected to exhibit a voltage drop greater than said at least one of said reference voltage signals during an overcurrent condition whereby said voltage at said I/O terminal connected to said first input terminal of said comparator becomes higher than said reference signal generator voltage causing said comparator to change state and provide said second signal to said CPU for causing said CPU to remove gate drive signals to said gate drive circuit thereby disabling said FET.

6. The I/O circuitry of claim 5 said CPU establishes a predetermined time delay interval between initiation of conduction of said FET and comparison of said reference signals to said I/O terminal voltage for preventing disabling of said FET during initial enabling transients.

7. The I/O circuitry of claim 6 wherein the CPU is effective to enable said gate drive circuit to force said FET out of conduction when said I/O terminal voltage exceeds said at least one of said selected reference voltage signals.

8. The I/O circuitry of claim 5 wherein said FET is selected to limit current therethrough below a preselected fault current level.

* * * * *

UNITED STATES PATENT AND TRADEMARK OFFICE
CERTIFICATE OF CORRECTION

PATENT NO. : 4,951,250

DATED : 08/21/90

INVENTOR(S) : Ancil B. Crickshank, Ronald E. Gareis, Mark J. Kocher, Michael J. Tuso It is certified that error appears in the above-identified patent and that said Letters Patent is hereby corrected as shown below:

On the title page, please insert item [73] Assignee: GE Fanc Automation North America, Inc., Charlottesville, Virginia 22906.

Signed and Sealed this

Thirtieth Day of June, 1992

Attest:

DOUGLAS B. COMER

Attesting Officer     Acting Commissioner of Patents and Trademarks